June 20, 1967

C. R. YOUNG ETAL 3,326,292

MULTIPLE STRING WELL PUMPING SYSTEM AND APPARATUS

Filed Dec. 7, 1964

INVENTORS
CARTER R. YOUNG
ROBERT B. McAMIS
BOBBY G. FOSTER

BY *Hastings Ackley*
*and*
*Walter J. Jaymo*

ATTORNEYS

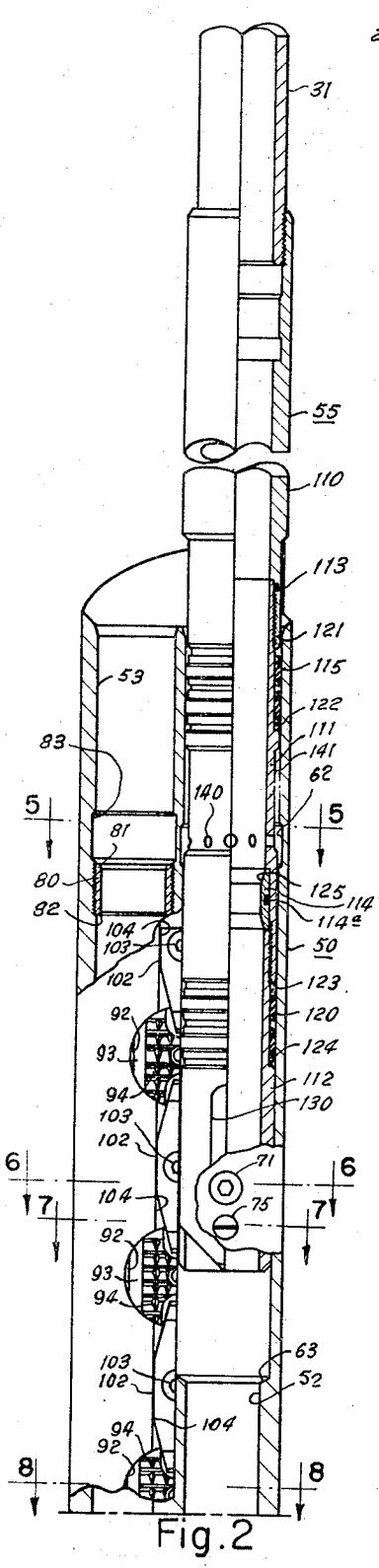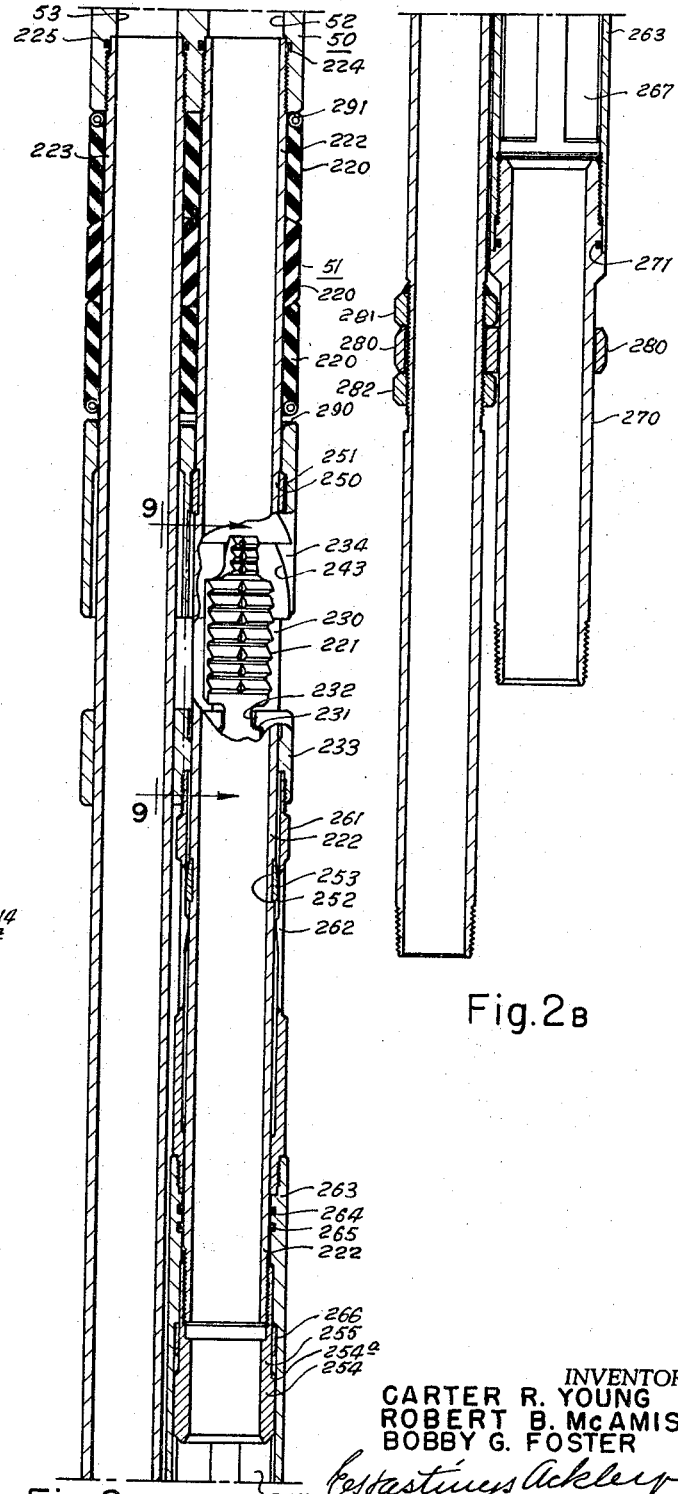

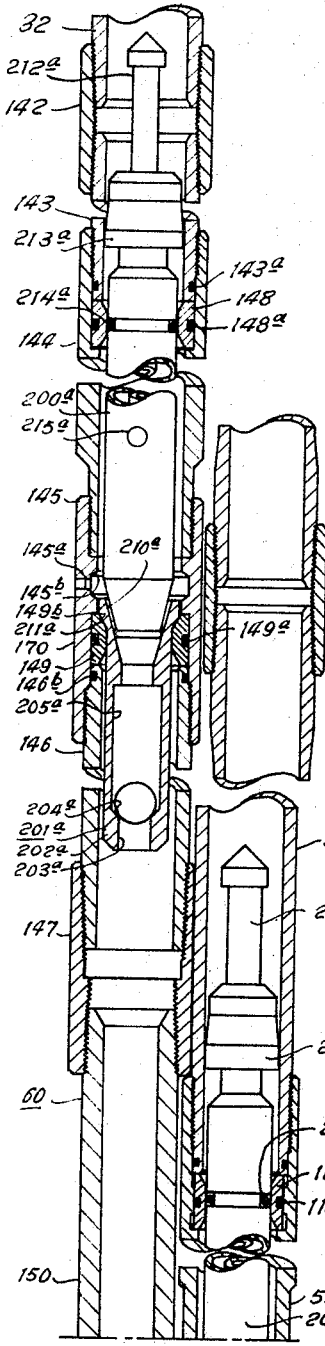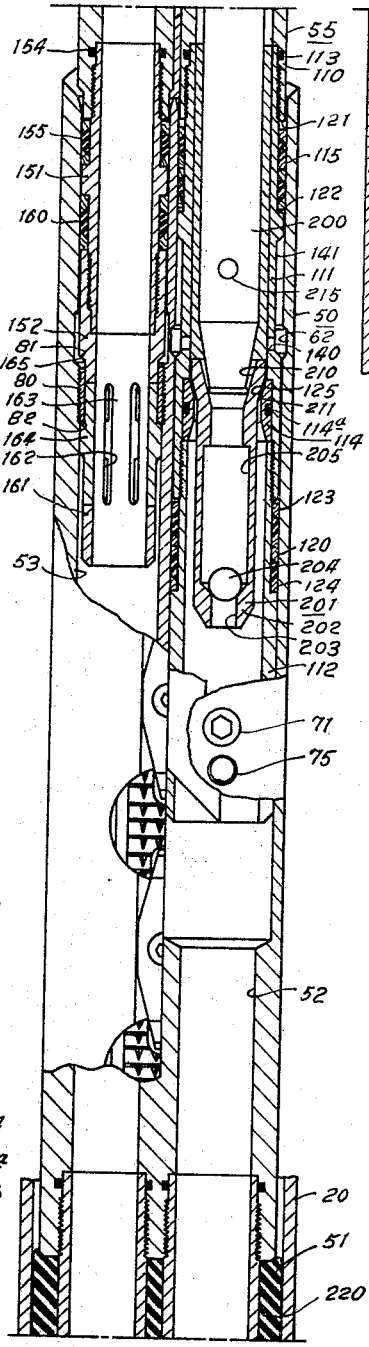

United States Patent Office 3,326,292
Patented June 20, 1967

3,326,292
MULTIPLE STRING WELL PUMPING SYSTEM AND APPARATUS
Carter R. Young and Robert B. McAmis, Dallas, Tex., and Bobby G. Foster, Oklahoma City, Okla., assignors to Otis Engineering Corporation, Dallas, Tex., a corporation of Delaware
Filed Dec. 7, 1964, Ser. No. 416,519
22 Claims. (Cl. 166—106)

ABSTRACT OF THE DISCLOSURE

A system and apparatus, for use in wells having multiple producing zone separated by a plurality of packers, for producing the well zones through multiple strings of pipe with pump means for producing fluids from said zones operatively connected with a plurality of said strings of pipe above the upper packer, wherein the pipes are arranged for disconnection from the upper packer for removal of said plurality of pipes and the pump means connected therewith independently of each other and without disturbing the packers.

---

This invention relates to well tools and more particularly to well tools and apparatus for producing fluids from several formations through one well bore.

It is an object of this invention to provide a new and improved apparatus for producing fluids from several formations through a single well bore.

It is another object of this invention to provide a new and improved well tool for supporting several pump and valve units within a well bore in communication with different producing zones wherein the pump and valves may be removed for purposes of repair and replaced without withdrawing the entire system from the well bore.

It is a very important object of the invention to provide a well apparatus for producing well fluids from several different zones in communication with a well bore wherein the various tubing strings through which the well fluids are transported to the surface may be removed and replaced while leaving the packer means which separate the producing zones in position within the well bore.

It is another object of the invention to provide a packer head for use with a well packer for sealing around several tubing strings wherein both pump and valve assemblies and the tubing strings may be withdrawn from and reinserted into the head without removal of the head from the well bore.

It is another object of the invention to provide a system for pumping oil from several producing zones wherein the oil from one zone along with the fluid employed to operate the pump for that zone is returned to the surface through the annual space around the tubing strings while the oil from another zone along with the fluid used to operate the pump for that zone is returned to the surface through a tubing string.

It is another object of the invention to provide a multiple-string downhole packer for use with hydraulic pumps for pumping well fluids from several producing formations.

It is another object of the invention to provide a multiple-string packer for use with hydraulic pumps wherein the pumps may be withdrawn to the surface and returned to the packer without disturbing the setting of the packer within the well bore.

It is a further object of the invention to provide a packer for use in a well bore to produce well fluids from several formations wherein any one or all of the tubing strings extending to the packer may be removed from and reintroduced into the packer without altering the setting of the packer.

It is another object of the invention to provide a system for packing off several producing formations in communication with a well bore and pumping well fluids from such formations, such system including a permanent type packer and a retrievable, multiple-string packer which is set in the well bore by adjustment of the weight imposed by the tubing strings on the packer.

It is a still further object of the invention to provide a packer head for a multiple-string packer wherein one of the tubing strings is provided wtih means allowing communication with one producing zone and with the annular space above the packer around the tubing strings and another tubing string is provided with means for communication with another producing zone and with a third of the tubing strings.

Additional objects and advantages of the invention will be readily apparent from the reading of the following description of a device constructed in accordance with the invention, and reference to the accompanying drawings thereof, wherein:

FIGURE 1 is a diagrammatic representation partly in section and partly in elevation illustrating the system of the invention installed within a well bore in communication with two producing zones;

FIGURES 2, 2a and 2b constitute a view partially in section and partially in elevation of the apparatus of the invention including a packer, a packer head, and a landing nipple installed in the packer head and connected to the lower end of the first tubing string;

FIGURE 9 is a longitudinal view in section illustrating the slip carrier and slip mandrel as viewed in a plane between the slips substantially as represented by the line 9—9 of FIGURE 2a;

Figure 12:
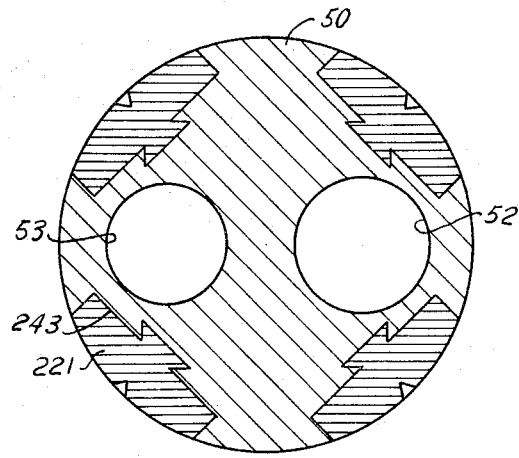
Figure 9:
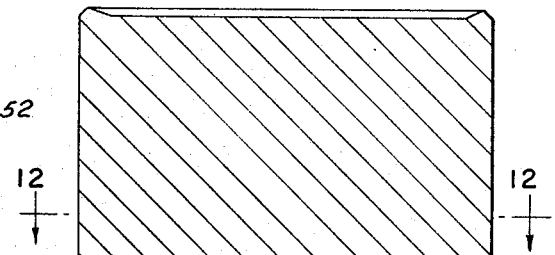

FIGURE 11, 11a, and 11b constitute a view partially in section and partially in elevation showing the packer and packer head of the invention with the landing nipples for the first and second tubing strings installed in the head along with the hydraulic pumps and standing valves positioned within the nipples; and, FIGURE 12 is a view in section of the slip mandrel along the line 12—12 of FIGURE 9.

Figure 1:
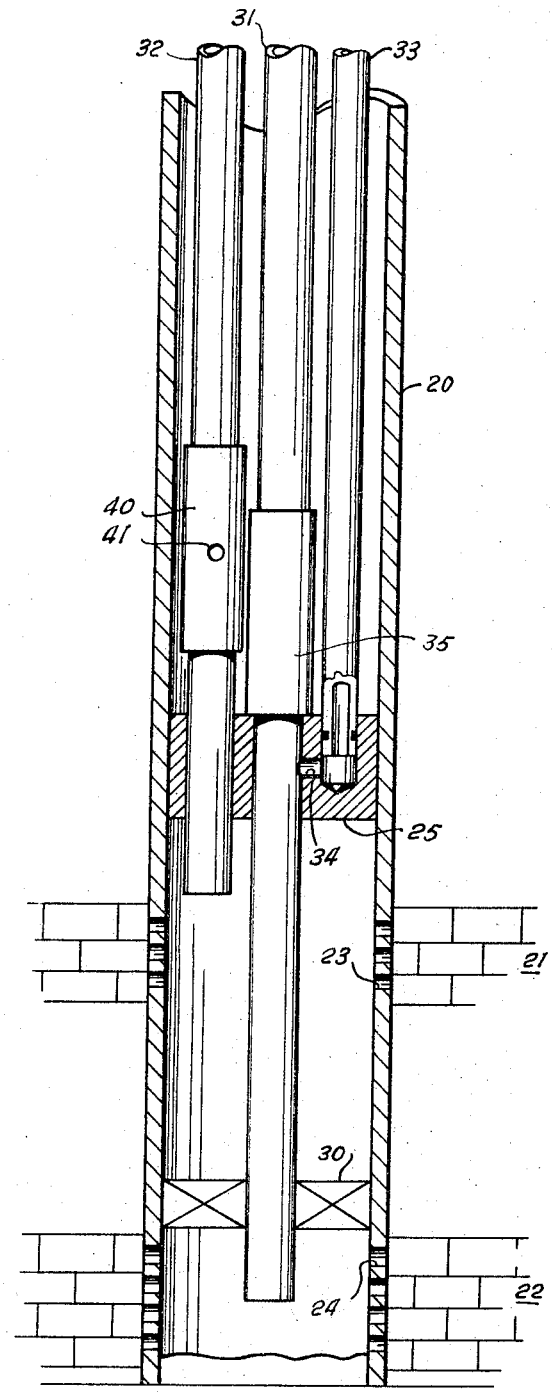

Referring to FIGURE 1, a well casing 20 extends through a first upper producing formation 21 and a second lower producing formation 22. The well casing is perforated at 23 into the upper producing formation and at 24 into the lower producing formation. An upper multiple-string retrievable packer 25 is engaged with the inside wall of the casing above the upper producing formation. Also, engaged with the inside wall of the casing is a suitable single-string packer 30 which is positioned above the lower producing formation. A first tubing string 31 extends through the upper and lower packers to provide a means for producing fluids from the lower producing formation. A second producing string 32 extends through the upper packer only to provide communication with and means for producing the upper formation. A third tubing string 33 terminates in the upper packer and is in communication with the first tubing string through the horizontal flow passage 34 in the upper packer. The special landing nipple 35 in the first tubing string houses a hydraulic pump and standing valve employed for producing the well fluids from the lower formation. Power oil is directed downwardly through the first tubing string to the hydraulic pump. Well fluids from the lower formation enter the casing through the perforations 24 and flow into the lower end of the first tubing string. A pump within the nipple 35 discharges the well fluids from the lower formation and the exhausted power oil used to actuate the pump through the passage 34 into the third tubing string 33 through which the power oil and lower formation well fluids flow to the surface.

The landing nipple 40 in the second tubing string 32 encloses a standing valve and a hydraulic pump. Fluids from the upper formation 21 flow through the perforations 23 into the casing 20 and then into the lower end of the tubing string 32. The upper formation fluids are pumped outwardly from the unit 40 through the port 41 into the annular space around the tubing strings within the casing and the fluids flow in this annular space to the surface. The power oil delivered downwardly through the tubing string 32 to the pump within the nipple 40 also flows into the annular space and to the surface along with the fluids pumped from the upper formation.

The pumps in both the nipple 35 and the nipple 40 may be removed to the surface for replacement or repair and returned to the packer assembly without disturbing either the three tubing strings or the packer itself. To remove the pump from the first tubing string fluid is pumped downwardly through the third tubing string 33 into the packer where the fluid crosses over to the first tubing string through the passageway 34 forcing the pump from the nipple and to the surface through the first tubing string. When the pump has been serviced, it may be inserted into the first tubing string and allowed to drop downwardly back into place within the nipple 35. Removal of the pump from the nipple 40 is readily accomplished in a similar manner by pumping fluid downwardly through the casing 20 into the port 41 in the nipple 40 to lift the pump from the nipple to the surface through the second tubing string. The pump may be reinserted into the nipple 41 by allowing it to drop into place through the second tubing string. Any one or all of the tubing strings may be removed from the packer assembly and reinstalled in it as desired. It is to be understood that while FIGURE 1 diagrammatically illustrates the structure and function of the system of the invention and is presented for the purpose of initially providing a comprehensive understanding of the invention, the FIGURES 2–11b show one specific embodiment of the invention.

Figure 10:
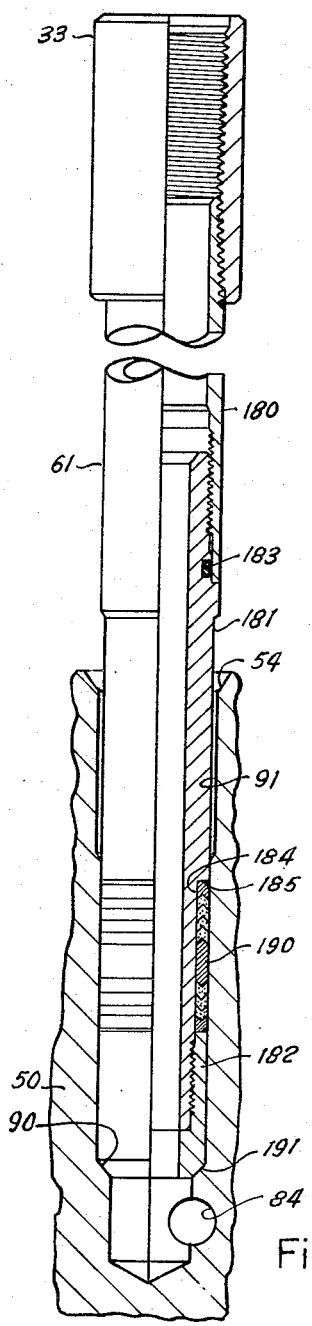
FIGURE 10 is a view partially in section and partially in elevation showing the landing nipple used for connecting the third tubing string into the packer head.
Figure 3:
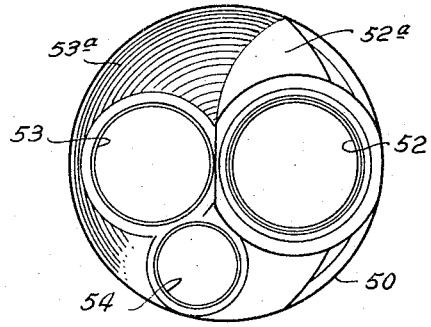
FIGURE 3 is a top view in elevation of the packer head of the invention with all of the landing nipples removed.

Referring now to FIGURES 2 and 2a, a packer head 50 is threadedly engaged at its lower end to a packer assembly 51. As shown in FIGURE 3 the packer head 50 is provided with a first bore 52 into which the first tubing string 31 is engaged, a second bore 53 for receiving the second tubing string 32, and a third bore 54 for receiving the third tubing string 33. Three special landing nipples are employed for engaging the tubing strings in the packer head and for supporting the hydraulic pump and standing valve units. The first landing nipple 55 is shown in FIGURE 2 installed in the bore 52 of the packer head. The second landing nipple 60 is shown in FIGURES 11 and 11a engaged in the bore 53. The third landing nipple 61 is shown in FIGURE 10 engaged in the bore 54 of the packer head. Only a fragment of the packer head around the bore 54 is illustrated in FIGURE 10.

Figure 4:
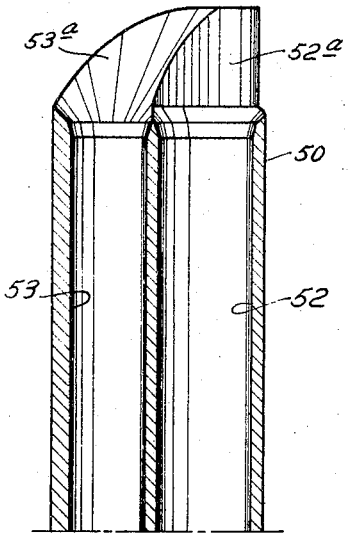
FIGURE 4 is a view partially in section and partially in elevation of the upper end of the packer head illustrated in FIGURE 3.

The upper end of the packer head, as seen in FIGURE 4, is contoured to provide the bores 52 and 53 with a flared or frusto-conical upper end to guide the landing nipples 55 and 60 into its respective bore. Referring specifically to FIGURE 4 the upper end of the bore 52 is formed into a frusto-conical surface 52a while the upper end of the bore 53 has a similar surface 53a. The frusto-conical surfaces leading into each of the bores are substantially tangent to each other. In addition to the conical entries in the bores 52 and 53 the surface of the upper end of the head also slopes downwardly and inwardly along each of the bore ends to provide a surface similar to a valley where the bores 52 and 53 are tangent. This valley shape guides the third landing nipple into the bore 54.

Figure 7:
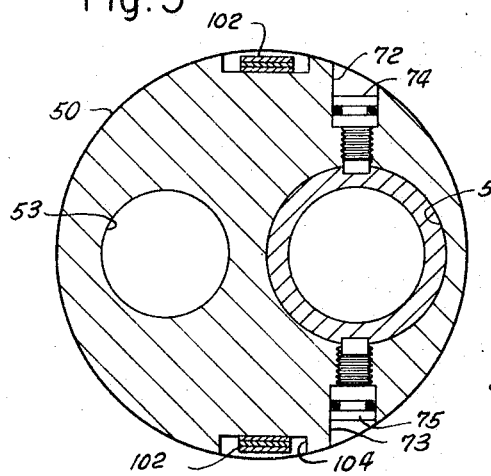
FIGURE 7 is an enlarged view in section taken along the lines 7—7 of FIGURE 2.
Figure 6:
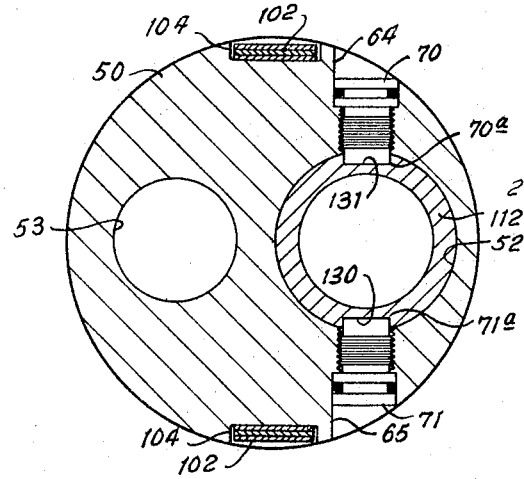
FIGURE 6 is an enlarged view in section taken along the line 6—6 of FIGURE 2.

Referring to FIGURE 2, the bore 52 within the packer head is enlarged at 62 to provide an annular recess for fluid flow when the landing nipple 55 is engaged with the head. Also, formed within the bore 52 below the annular recess 62 is an internal annular shoulder 63. As illustrated in FIGURE 6, two bores 64 and 65 extend through the packer head transverse to its longitudinal axis into the bore 52. These bores are internally threaded over a portion of their length. A threaded lug 70 having a smooth cylindrical inward end 70a is engaged in the bore 64 while an idenitcal threaded lug 71 with an inward end 71a is engaged in the bore 65. The ends 70a and 71a of the lugs project into the bore 52 to engage the nipple 55 in a manner which will be later explained. As illustrated in FIGURE 7 the packer head is provided with additional bores 72 and 73 positioned parallel to and below the bores 64 and 65. The bores 72 and 73 are threaded and open at their inward ends into the bore 52. The shear screws 74 and 75 are engaged in the bores 72 and 73, respectively. The inward end of each shear screw projects into the bore 52 to engage the nipple 55 for a purpose which will be later explained.

Referring to FIGURE 2, the bore 53, which functions to receive the landing nipple 60 as shown in FIGURE 11, is provided with a ring 80 threadedly engaged within the bore. The ring 80 forms within the bore an upwardly facing shoulder 81 and a downwardly facing shoulder 82. Above the ring 80 the bore is enlarged to form an annular recess 83.

Figure 5:
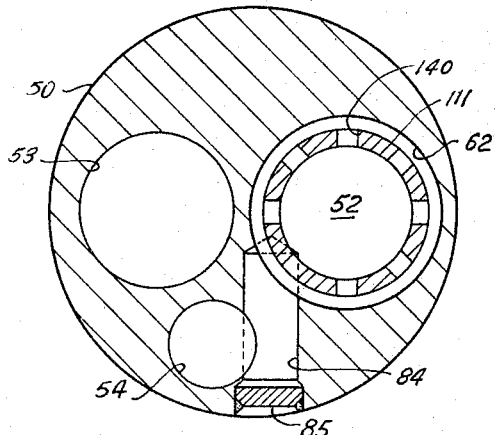
FIGURE 5 is an enlarged view of section taken along the line 5—5 of FIGURE 2.

Referring to FIGURE 10 the bore 54, as distinguished from the bores 52 and 53, terminates within the packer head at a location just below the annular recess 62. The position of the bore 54 relative to the bores 52 and 53 is best seen in FIGURES 3 and 5. The longitudinal axes of the bores are parallel to each other. As represented in FIGURE 5 and in FIGURE 10, a horizontal bore 84 extends through the packer head into the bore 52. The bore 84 also intersects the bore 54. A plug 85 is welded into the bore 84 to close off the outward end of the bore. The bore 84 is extended into the packer head from the outside and then plugged as a construction expedient to provide the desired flow passage. The bore 84 functions as a flow passage to provide fluid communication across and between the lower end of the bore 54 and the bore 52. The bore 84 functions the same as the bore 34 in the diagrammatic presentation of the invention in FIGURE 1 to provide direct fluid communication between the first pipe string 31 and the third pipe string 33. It will be evident that the depth of the bore 54 in the packer head is determined by the location of the bore 84, it being necessary to extend the bore 54 downwardly only a sufficient distance to provide a crossover flow passage for fluids from the lower end of the bore 54 into the bore 52. A shoulder 90 is formed within the bore 54 above the bore 84 to provide support for the lower end of the landing nipple 61. The bore 54 is enlarged at 91 to facilitate insertion of the landing nipple into the bore.

Figure 8:
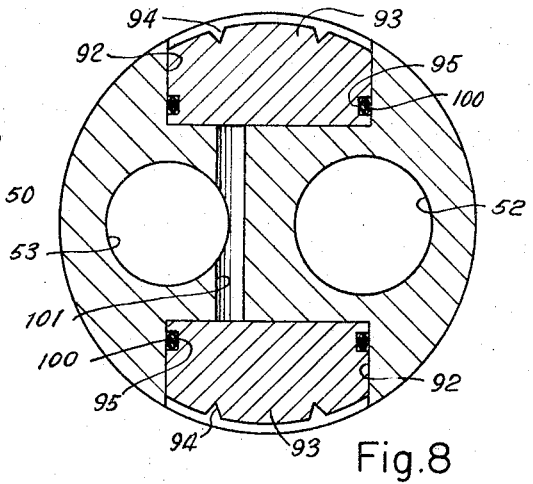
FIGURE 8 is an enlarged view in section taken along the line 8—8 of FIGURE 2.

The packer head is provided with a plurality of the cylindrical recesses 92 as shown in both FIGURES 2 and 8. The recesses are positioned along the length of the head and on opposite sides thereof. Within each of the recesses is a hold-down button 93 provided along its external surfaces with teeth 94 for engaging the internal surface of the casing 20 to hold the packer head down in the event an excessive pressure is exerted below the packer. Each of the hold-down buttons is provided with a circumferential groove 95 in which is a seal 100, such as an O-ring, to prevent fluid leakage through the recess around the button. Each opposite pair of the recesses 92 are connected by a transverse flow passage 101 through the packer head intersecting the bore 53 so that pressure from below the packer assembly 51 as exerted through the second pipe string and bore 54 will be imposed upon the back face of each of the hold-down buttons to push the hold-down buttons outwardly into contact with the inside wall of the casing so that a high pressure from below the packer will not raise the packer in the borehole. The hold-down buttons are therefore designed to function only when a pressure below the packer tends to lift the packer. At times when there is not a sufficient pressure differential across the packer to lift it, the hold-down buttons are retained in a retracted position within the recesses by the leaf spring units 102 which are secured to the packer head by the bolts 103. The spring units are fitted in the longitudinally extending recesses 104 formed along the outer surface of the packer head between and connecting the recesses 92. The recesses and the leaf spring units positioned therein are shown in cross-section in FIGURES 6 and 7, respectively. The thicknesses of the leaf spring units and of the hold-down buttons are such that when the hold-down buttons are not functioning, neither they nor the leaf springs will project outward of the surface of the packer head to obstruct movement of the packer head through the casing. No portion of the hold-down buttons or their spring units should project beyond the normal surface of the packer head except when the hold down buttons are functioning to restrain the packer from upward movement caused by excessive pressure below the packer. The strength of the spring assemblies is calculated to restrain the hold-down buttons in their respective recesses except under such conditions that a pressure in excess of a predetermined value is exerted through passages 101 behind the hold-down buttons.

The first tubing string 31 is engaged with the packer head by the first landing nipple 55 which is illustrated in the operating position in FIGURES 2, 11 and 11a. As previously stated, this landing nipple also functions to support a hydraulic pump and a standing valve. The first landing nipple comprises an upper coupling section 110, an intermediate section 111 and a lower section 112. The upper and intermediate sections are threadedly engaged with each other with a packing ring 113 interposed between them to prevent fluid leakage along the threaded connection. Engaged within the upper section, as in FIGURE 11a, is a ring 110a having a seal 110b in contact with the inner wall of the section. The ring aids in positioning and forming a seal around a hydraulic pump in the nipple. The intermediate section 111 is threadedly engaged to the lower section 112 with an annular ring 114 provided with a ring seal 114a positioned between the sections. The packing assemblies 115 and 120 are fitted around the intermediate and lower sections, respectively, to form a fluid tight seal at the locations of the packing assemblies with the internal surface of the bore 52. The upper packing assembly 115 fits between the shoulder 121 formed by the lower end of the upper section and a shoulder 122 formed around the outer surface of the intermediate section. The packing 120 fits between a shoulder 123 formed by the lower end of the intermediate section and a shoulder 124 formed around the outer surface of the lower section. The upper end of the ring member 114 is sloped downwardly and inwardly to form the shoulder 125 which supports the standing valve and hydraulic pump assembly employed within the first landing nipple.

Coventional J-slots 130 and 131 are formed in the outer surface of opposite sides of the lower section 112 extending along the length of the section. The J-slots are open at the lower end of the landing nipple and, as illustrated in FIGURE 6, are engageable with the inward ends 70a and 71a of the lugs 70 and 71, respectively. One form of J-slot which may be used is illustrated on page 3642 of the 1964–65 edition of the Composite Catalog of Oil Field Equipment and Services, published by the Gulf Publishing Company, Houston, Tex. The cooperative action of the J-slots and the lugs permits the landing nipple to be engaged and disengaged as desired by up and down and rotative motion of the first tubing string in a conventional manner. When the landing nipple is initially installed in the packer head, the shear screws 74 and 75 are engaged with the lower portion 112 of the landing nipple as illustrated in FIGURE 7.

The first landing nipple is provided with a plurality of the ports 140 formed through the intermediate portion 111 positioned to communicate with the annular recess 62 within the flow channel 52 when the landing nipple is positioned within the bore. As shown in FIGURE 2, the intermediate portion of the landing nipple is of reduced diameter in the vicinity of the ports 140 forming an external annular recess 141. The ports 140 cooperate with the annular recess 62 to permit fluid communication from the bore 54 through the horizontal flow passage 84 into the interior of the first landing nipple.

The second landing nipple, as illustrated in FIGURES 11 and 11a, serves to support a hydraulic pump and standing valve and to connect the second pipe string into the packer head. The second landing nipple is secured to the lower end of the second tubing string by a coupling 142. The landing nipple includes a tubing section 143, the couplings 144 and 145, the tubing section 146, and a coupling 147. Between the tubing section 143 and the coupling 144 is a ring seal 143a to minimize leakage along the connection between these members. Engaged within the coupling 144 is a ring 148 having a seal 148a in contact with the inner wall of the coupling 144 around the outer wall of the ring. As will be explained later, the ring positions and aids in forming a seal around a hydraulic pump in the nipple. The coupling 145 is provided with a plurality of radial ports 145a and an annular recess 145b to allow flow of pumped fluids through the coupling into the annular space within the well casing 20. Engaged within the coupling 145 is a ring 149 which has a seal 149a to effect a sealing relationship with the inner wall of the coupling. A downwardly and inwardly sloping surface on the upper end of the ring forms a shoulder 149b for supporting a standing valve. A seal ring 146b is located around the upper end of the tubing section 146 to effect a seal with the inner wall of the coupling 145. Engaged with the lower end of the coupling 147 is that portion of the second landing nipple which is positioned within the bore 53 of the packer head. This portion of the landing nipple within the second bore includes an upper section 150, an intermediate section 151, and a lower section 152. Fluid leakage through the threaded connection between the upper and intermediate sections 150 and 151 is prevented by the ring seal 154. The packing assemblies 155 and 160 are fitted around the intermediate section 151. The lower portion of the lower section comprises a collet 161 having a plurality of elongated slots 162 forming the collet fingers 163 from which project the collet bosses 164. Where the collet joins the remaining portion of the lower section 152 there is formed a shoulder 165. The collet fingers are adapted to move inwardly to allow the bosses to pass through the ring 80 snapping outwardly below the ring where the upper ends of the bosses engage the lower shoulder 82 on the lower end of the ring to hold the nipple within the second bore. The positioning and functioning of the hydraulic pump and standing valve used in association with the second landing nipple will be described later.

The third landing nipple, is illustrated in FIGURE 10, positioned within the bore 54 of the packer head. This landing nipple functions solely as a detachable fluid conducting connection between the third pipe string 33 and the packer head. The landing nipple includes an upper section 180, an intermediate section 181 and a lower section 182. The upper and intermediate sections are threadedly engaged with each other with a seal 183 positioned around the outer surface of the intermediate section within the lower end of the upper section to minimize fluid loss along the threaded connection. The intermediate section is reduced in diameter along a portion 184 providing a shoulder 185. Positioned between the shoulder 185 and the upper end of the lower section 182 is a packing assembly 190 which fits around the lower portion of the intermediate section to form a fluid seal with the internal surface of the bore 54 in the packer head. As has been earlier pointed out, power oil and pumped well fluids from the lower formation are forced through the horizontal flow passage 84 into the bore 54 and to the surface through the third landing nipple and the tubing string 33. The lower end of the lower section of the landing nipple is provided with a shoulder 191 which seats on the internal shoulder 90 within the bore.

Hydraulic pump and standing valve assemblies are positioned in the landing nipples of the first and second tubing strings to pump the well fluids from the upper and lower formations. Referring specially to FIGURES 11 and 11a, a hydraulic pump and standing valve assembly comprising a pump 200 and a standing valve 201 is positioned within the first landing nipple 55 to pump fluids from the lower producing formation. As shown in FIGURE 11a the standing valve 201 is a vertically positioned check valve permitting entry of fluids from below and preventing the fluids draining back into the lower portion of the bore 52. The standing valve includes a body 202 provided at its lower end with an intake port 203 at the upper end of which a ball check valve 204 may seat. A central bore 205 forms a flow passage throughout the length of the standing valve. The upper end of the standing valve body is flared outwardly forming a downwardly and inwardly sloping seat 210 and an upwardly and outwardly extending sloping external shoulder 211 which seats on the seat 125 of the landing nipple to support the standing valve and pump. The hydraulic pump 200 includes a fishing neck 212 at the upper end for engagement of a suitable wire line tool. A swab cup assembly 213 is secured below the fishing neck and has downwardly facing lips engageable with the internal surface of the tubing string. Hydraulic pressure below the swab cup will lift the pump for purposes which will be later explained. An external seal 214, such as an O-ring, is fitted around the main pump body to cooperate with the ring 110a to prevent flow of fluids upwardly around the pump body. The pump body has formed therein a plurality of discharge ports 215 for the pumped fluids. The lower end of the pump seats on the surface 210 at the upper end of the standing valve so that fluids flowing through the standing valve will flow into the lower end of the pump to be then discharged from the pump through the ports 215. It will be noted that the diameter of the pump body is somewhat less than the internal diameter of the intermediate section of the landing nipple so that fluids from the ports 215 may flow around the pump body to the ports 140 through which the fluids leave the landing nipple to enter the recess 62 and then the horizontal flow passage 84 connecting with the third tubing string.

A hydraulic pump and standing valve assembly identical to the assembly positioned within the first landing nipple is positioned within the second landing nipple 60, as illustrated in FIGURE 11. The pump-valve assembly in the second landing nipple has been designated by the same reference numerals with the suffix $a$ added as were used in connection with the description of the assembly in the first landing nipple. In brief, the pump-valve assembly in the second landing nipple includes a hydraulic pump 200a and a standing valve 201a. The shoulder 211a on the standing valve rests on the seat 149b within the second landing nipple to support the pump-valve unit. The fluids flowing from the upper producing formation flow through the second landing nipple 60 into the pump-valve unit and are discharged through the ports 215a. The fluids flow around the pump to the recess 145b and pass from the nipple through the ports 145a into the annular space within the casing 20 through which the fluids flow to the surface. For further details on the pump-valve assembly in the second landing nipple reference may be had to the above description of the pump-valve assembly employed in the first landing nipple.

The hydraulic pump and standing valve assemblies used in both the first and second landing nipples may be one of several commercially available pump-valve assemblies. For example, one suitable pump-valve assembly is illustrated at page 1847 of the Composite Catalog of Oil Field Equipment and Services, 1962-63 Edition, published by the Gulf Publishing Company, Houston, Tex.

The multiple string packer 51 with which the packer head and landing nipples are assembled, as represented diagrammatically by packer 25 in FIGURE 1, is illustrated in detail in FIGURES 2a, 2b, 11a and 11b. Referring specifically to FIGURE 2a, the packer 51 includes a plurality of seal elements 220 and the slips 221 engaged on the carrier mandrels 222 and 223. The slips support the packer by engaging the inside wall of the casing while the seal elements effect a sealing relationship with the wall. The sealing elements are formed of a rubber-like material which when squeezed from opposite ends will expand into engagement with the inside wall of the casing. The carrier mandrels are threadedly engaged into the lower end of the packer head 50 with the bore of the mandrel 222 forming a continuous flow passage with the bore 52 and the bore of the mandrel 223 forming a continuous flow passage with the bore 53 of the head. A ring seal 224 effects a seal around the mandrel 222 with the head and a similar ring seal 225 effects sealing relationship around the mandrel 223 with the packer head. Each of the slips 221 is contoured to match the circular external surface of the packer and the wall of the casing and is provided with the teeth 230 and a dovetailed lower end 231 which engaged a dovetailed recess 232, in the slip carrier 233. Several of the slips are positioned around the packer. For example, four slips may be evenly positioned around the surface of the packer. A slip mandrel 234 is positioned around the carrier mandrels 222 and 223. As illustrated in FIGURE 9 the slip carrier is provided with the bores 235 and 240 to accommodate the heads of the bolts 241 and 242 which are threadedly engaged in the lower end of the slip mandrel to limit the relative movement of the slip carrier and slip mandrel. Sufficient tolerance is provided in the diameter of each of the bores 235 and 240 to allow the heads of the bolts 241 and 242 to slide along the length of the bores as is evident in FIGURE 9. The slip carrier supports the slips which are engaged in the dovetailed recesses with the bores 235 and 240 allowing relative movement between the slip carrier and slip mandrel so that the slip carrier and the mandrel may be moved toward each other causing the slips to slide along the outer surface of the recesses 243 provided around the slip mandrel. A cross-section of the slip mandrel with the slips is shown in FIGURE 12. The downwardly and inwardly sloping recesses 243 cause the slips to be pushed outwardly as the slip carrier moves up the slips upwardly along the surfaces of the mandrel.

The carrier mandrel 222 extends downwardly through the seal elements and the slip assembly a substantial distance. An annular recess 250 is formed around the carrier mandrel below the seal elements to receive a snap ring 251. A second annular recess 252 is formed around the external surface of the carrier mandrel to accommodate a snap shoulder 253 which fits around the mandrel within the recess with the lower end of the snap shoulder projecting farther outward from the mandrel than the upper portion of the snap shoulder. Threadedly engaged on the lower end of the carrier mandrel is a key sub 254 which is of reduced diameter along its upper portion at 255. The key sub has several lands and grooves extending along the length of its outer surface.

Continuing with the reference to FIGURE 2a, a collet 261 having a plurality of the longitudinally extending laterally resilient fingers 262 is threadedly engaged into the lower end of the slip carrier 233. Threadedly engaged to the lower end of the collet is a key weld 263. Ring seals 264 and 265 are fitted within the upper portion of the key weld around the lower portion of the carrier mandrel 222 to minimize fluid leakage along the surfaces when the carrier mandrel is moved relative to the key weld. A ring 266 having a downwardly extending slotted lower portion is secured within the key weld around the key sub 254. The slotted portion of the ring forms the downwardly extending fingers 267 which form straight lands and grooves along the inner wall of the key weld to engage the key sub allowing the sub to slide up and down but preventing its rotation. A primary tubing adapter 270 is threadedly engaged with the lower end of the key weld with a seal ring 271 being positioned in a slot formed around the outer surface of the sub to effect sealing engagement between the upper end of the tubing adapter and lower end of the key weld.

The second carrier mandrel 223 extends through the seal elements and the slips to a location below the lower end of the primary tubing adaptor 270. The second carrier mandrel is not directly connected to the seals, the slip mandrel, or the carrier mandrel as these elements are primarily supported and operated in association with the first carrier mandrel. Disposed around the lower portion of the second carrier mandrel is a guide ring 280 which also encircles the primary tubing adapter with a sliding fit so that the tubing adapter may move relative to the guide ring. On opposite sides of the guide ring and threadedly engaged on the second carrier mandrel are the nuts 281 and 282 which aid in retaining the guide ring on the mandrel.

The upper end of the slip mandrel 234 forms a shoulder 290 while the lower end of the packer head 50 forms a similar shoulder 291, the two shoulders cooperating to confine the seal elements and when urged toward each other effect outward expansion of the elements as will be explained in greater detail hereinafter.

The installation and operation of the production system of the invention is carried out in the following manner. The lower packer 30, as diagrammatically illustrated in FIGURE 1, is installed within the casing 20 above the lower producing formation 22. The packer 30 may be any suitable form of permanent type packer set by any one of a number of conventional procedures, such as the use of a tubing string or a wire line system. For example, the packer 30 may be an Otis type WA Production Packer, illustrated on page 3638 of the Composite Catalogue of Oil Field Equipment and Services, 1964–65 Edition, published by Gulf Publishing Company, Houston, Tex. The lower permanent packer is set by conventional wire line procedure in the desired location within the casing.

Subsequent to the setting of the lower permanent type packer the upper multiple string packer with its associated head and landing nipples is made up on the first tubing string 31. The packer head 50 is engaged with the packer assembly 51 as follows. The seals 224 and 225 are placed in the grooves provided in the lower end of the packer head. The packer head 50 and the packer assembly 51 are then secured together by engaging the upper threaded ends of the carrier mandrels 222 and 223 into the lower end of the packer head. The first carrier mandrel is rotated by turning the primary tubing adapter 270 which will effect rotation of the carrier mandrel due to the engagement of the lands and grooves in the key weld with the key sub which is secured to the lower end of the first carrier mandrel. Since the second carrier mandrel 223 is one unitary piece throughout its length, rotation of it from its lower end will result in its being threadedly engaged into the lower end of the bore 53 in the packer head.

After the packer head and packer assembly are fully engaged with each other the first landing nipple 55 is positioned within the bore 52 at substantially the location illustrated in FIGURE 2. The landing nipple is lowered into the packer head until the lugs 70 and 71 are engaged in the J-slots and the shear screws 74 and 75 are inserted through the packer head into the lower portion of the landing nipple, as shown in both FIGURES 2 and 7. The shear screws serve to retain the landing nipple in position within the packer head until such time after installation as it is necessary to remove the landing nipple for servicing purposes. While the landing nipple is retainable in the packer head by the engagement of the lugs 70 and 71 with the J-slots 130 and 131 in the landing nipple, the shear screws serve as a safety device to further insure that the landing nipple and the packer head will remain in the proper engagement with each other. When the first landing nipple is installed in the packer head, the ports 140 in the nipple will be substantially in alignment with the recess 62 so that fluid flow can occur through the ports into the recess. It will be recognized however, that the reduced portion 141 of the landing nipple provides an annular space along the length of the nipple which will compensate for some longitudinal misalignment of the landing nipple and head. After engagement of the landing nipple and the packer head, a length of tubing string 31 is secured to the primary tubing adapter 270 below the packer so that the first string of tubing will extend from the upper packer through the lower permanent packer when the upper multiple string packer is at the proper elevation within the well casing, as shown in FIGURE 1. The particular tubing and sealing elements for extension of this first tubing string to and through the lower permanent packer have not been illustrated in detail inasmuch as they comprise conventional well known equipment. For example, the extension of tubing connected to the primary tubing adapter will include a seal nipple for effecting a seal around the outside of the tubing with the bore through the lower packer and stop shoulder above the seal nipple to properly position the seal nipple within the lower packer as the tubing string is lowered into position through the lower packer. In addition to serving the function of locating the seal nipple within the lower packer the stop shoulder will rest on the lower packer to form a vertical support for the tubing string to permit setting of the upper packer in a manner to be explained.

With the necessary equipment secured to and below the primary tubing adapter, the first landing nipple is engaged with the first tubing string 31 and the tubing string is lowered into the well bore on the tubing string until the portion of the tubing string below the upper packer is seated in the lower packer with the seal nipple engaged with the bore of the packer and the stop shoulder resting on the upper end of the lower packer. Additional weight is then imposed on the packer head through the mechanism of the first landing nipple and the weight of the tubing string 31. The portion of the tubing string below the upper packer is now supported by the lower packer and may not move downwardly. The primary tubing adapter 270 is therefore prevented from moving downwardly. With the primary tubing adapter up through and including the slip carrier and slips being restrained from downward movement and a downward force being imposed on the packer head by the weight of the first tubing string, the carrier mandrels 222 and 223 are forced in a downward direction. As previously explained, the first carrier mandrel 222 down through and including the key sub 254 and the entire length of the second carrier mandrel 223 slide through the assembly of packer elements and the slip assembly. A downward force is applied to the upper end of the seal elements 220 by the shoulder 291 on the lower end of the packer head. This downward force is in turn imposed by the lower end of the seal element assembly on the upper shoulder 290 on the upper end of the slip mandrel 234 causing the slip mandrel to move downwardly with the carrier mandrels toward the slip carrier which is being restrained from downward movement. With the slip mandrel moving toward and relative to the slip carrier the sloping surfaces 243 on the slip mandrel push the slips 221 in an outward direction into engagement with the internal wall of the well casing 20. When all of the slips are fully engaged with the wall of the casing, the slip mandrel is restrained by the wedging action of the slips from further downward movement so that the carrier mandrels slide downwardly through the slip mandrel resulting in further downward movement of the shoulder 291 toward the shoulder 290 effecting a compression and displacement outward of the seal elements 220 into engagement with the inside wall of the well casing.

After the upper multiple stringer-packer with its head and the first landing nipple and first tubing string are in operating position, as above described, the second and third tubing strings may be installed in the packer head. The second landing nipple, as illustrated in FIGURES 11 and 11a, is secured on the lower end of the second tubing string 32 and lowered through the well bore until the lower end of the second landing nipple is in contact with the upper end of the landing head. When this position of the equipment has been achieved, the lower end of the collet 161 will be moving along the upper contoured surface of the upper end of the packer head. Since the collet is larger than the bore 54 and due to the guiding provided by the frusto-conical inlets of the bores, the collet may be maneuvered into the bore 53 and then the landing nipple is lowered into the proper location in the bore as represented in FIGURES 11 and 11a. When the collet has entered the bore 53, the second tubing string is lowered so that the collet will become engaged with the proper shoulders within the bore. The collet moves downwardly until the outwardly extending bosses 164 on the collet fingers 163 engage the upper shoulder 81 of the ring 80 at which time the fingers of the collet are forced inwardly to allow the bosses to pass through the bore of the ring. After the bosses have passed through the bore of the ring, they snap outwardly below the ring to lock the collet down and allow the shoulder 165 on the collet to come to rest on the shoulder 81 of the upper end of the ring 80. With the second landing nipple thus engaged within the packer head the second tubing string is connected into the head.

The third landing nipple 61 is threadedly engaged on the lower end of the third tubing string 33 and the landing nipple and tubing string are lowered through the well bore until the landing nipple is engaged in the bore 54 in the packer head, as illustrated in FIGURE 10. Since both the first and second landing nipples have been previously installed in the packer head, only the bore 54 is available for the landing nipple to enter. Therefore, when the lower end of the landing nipple contacts the upper end of the packer head, it only need be maneuvered until it actually enters the bore itself and may be again lowered until the shoulder 191 on the landing nipple contacts the shoulder 90 within the bore.

The hydraulic pump 200 along with its standing valve 201 and the hydraulic pump 200a with the standing valve 201a are installed, respectively, in the first and second landing nipples and tubing strings by inserting each assembly into the tubing strings at the surface after the multiple string packer and the three tubing strings have been completely installed in the manner above described. The assemblies are allowed to fall downwardly through the tubing strings into position within the landing nipples. Since the well and thus the tubing strings are normally liquid filled, the liquid in the strings will dampen the fall of the pump-valve assemblies preventing their damage when they reach bottom. The pump-valve assemblies may also be pumped down the tubing string by circulating fluid down the strings until the assemblies seat in the nipple. For example, the hydraulic pump 200 is engaged with the standing valve 201 at the surface and the pump-valve assembly is introduced into the first tubing string and pumped or allowed to fall downwardly until the unit is seated in the first landing nipple with the shoulder 211 on the standing valve engaged with the shoulder 125 within the landing nipple. In a similar manner, the pump-valve assembly including the pump 200a and valve 201a is introduced into the second tubing string and pumped into the position illustrated in FIGURE 11 within the second landing nipple. At this time, the shoulder 211a on the standing valve is engaged with the shoulder 149b within the second landing nipple.

With the various elements comprising the apparatus of the invention installed in the well bore, as above described, the production system may now be used to produce well fluids from the upper formation 21 and the lower formation 22. Well fluids from the lower formation flow into the lower end of the first tubing string below the lower packer. Power oil is pumped from the surface downwardly through the first tubing string 31 into the upper end of the hydraulic pump 200 resulting in operation of the pump. The well fluids flowing from the lower formation move upwardly through the bore 52 to enter the lower end of the standing valve through the port 203. The ball 204 prevents back flow of the fluids above the valve. The fluids flow from the valve into the lower end of the pump. The fluids are forced from the pump through the ports 215. The fluids pumped through ports 215 flow through the annular space around the hydraulic pump within the intermediate portion of the landing nipple from where they flow through the ports 140 into the annular recess 62. The fluids then flow from the annular recess 62 through the horizontal flow passage 84 into the bore 54 in which the third landing nipple is positioned. The path of the fluids from the first into the third landing nipple is readily traceable by reference to FIGURE 5. The fluids flowing from the passageway 84 into the third landing nipple, as will be evident from an examination of FIGURE 10, flow into the third landing nipple at its lower end and upward through the third landing nipple and the third tubing string to the surface. The fluids following the above described path include the power oil exhausted from the pump.

The hydraulic pump 200a within the second landing nipple at the lower end of the second tubing string 32 is operated by power oil well pumped down the second tubing string into the upper end of the hydraulic pump at a location above the swap cup 213a. The power oil serves to actuate the hydraulic pump and is then exhausted from the pump housing through the ports 215a. The function of the hydraulic pump in the second landing nipple is to pump the fluids from within the well casing entering the well casing from the upper formation 21. With the packers in the positions illustrated in FIGURE 1, the lower end of the carrier mandrel 223 is located between the upper and lower packers and serves as the inlet for the fluids from the upper formation through the upper packer into the hydraulic pump for the second tubing string. The fluids enter the lower end of the carrier mandrel, pass through the bottom port 203a of the standing valve 201a, and then flow from the upper end of the standing valve into lower end of the hydraulic pump. The pumped fluids from the upper formation flow with the power oil out of the pump casing through the ports 215a. The power oil and the pumped well fluids from the upper formation enter the annular space around the hydraulic pump within the third tubing string and flow through the ports 145a into the annulus within the well casing 20 around the three tubing strings. The mixture of the well fluids from the upper formation and the exhausted power oil flow through the well casing to the earth's surface.

It is thus seen that the well fluids from the lower formation flow through the lower permanent packer in the first tubing string and are pumped by the hydraulic pump in that tubing string through a horizontal flow passage into the third tubing string through which the lower formation fluids and exhausted power oil from the hydraulic pump flow to the surface. The fluids from the upper formation flow through the upper packer through the third tubing string and are pumped by the hydraulic pump along with the exhausted power oil through the annular space within the well casing around the three tubing strings to the surface of the earth.

In the event it is necessary to service either the hydraulic pumps, the standing valves, or the landing nipples, the pumps may be removed from the landing nipples and tubing strings without disturbing the landing nipples; or, the tubing strings and any one or all of the landing nipples along with their respective tubing strings may be withdrawn from and reinserted into the upper packer.

The hydraulic pump 200 may be pumped from the first landing nipple through the first tubing string to the surface. In effect, a procedure of reverse circulation is carried out. Power oil is pumped from the surface through the third tubing string into the third landing nipple with the power oil flowing through the lower end of the landing nipple into the bottom portion of the bore 54. The power oil flows from the bore 54 through the horizontal flow passage 84 into the annular recess 62 from which the oil flows through the ports 140 in the intermediate portion of the first landing nipple into the annular space within the first landing nipple around the hydraulic pump. The pressure of the power oil on the downwardly facing surfaces of the hydraulic pump including particularly the swab cup 213 forces the pump upwardly out of the landing nipple and through the first tubing string to the surface where the pump is removed from the tubing string. The pump is reinserted into the first landing nipple by dropping it into the upper end of the first tubing string. The pump falls or is pumped through the first tubing string back into position within the first landing nipple as illustrated in FIGURES 11 and 11a.

The hydraulic pump in the second landing nipple and tubing string may also be removed by pumping it to the surface using a procedure of reverse circulation similar to that employed in the withdrawal of the pump from the first landing nipple. Power oil is pumped downwardly through the annular space within the well casing 20 around the three tubing strings and then inwardly into the second tubing string through the ports 145a. From the ports the power oil enters the annular space within the tubing string around the hydraulic pump 200a. The pressure of the power oil on the downwardly facing surfaces of the hydraulic pump including particularly the swab cup 213a lifts the hydraulic pump from the second landing nipple and forces it to the surface through the second tubing string. At the surface the pump is removed from the tubing string. When it is desired to reinstall the pump it is inserted back into the second tubing string and allowed to drop or is pumped through the tubing string into place in the second landing nipple, as illustrated in FIGURE 11.

Any one or all of the tubing strings and respective landing nipples may be removed from the upper packer and reintroduced into the packer without disturbing the setting of the packer. The first tubing string and landing nipple are removed in the following manner. The weight is increased on the first tubing string causing a lowering of the tubing string resulting in a shearing of the pins 74 and 75 to release the landing nipple from within the bore 52. Up until this time, the shear pins have prevented any relative movement between the first landing nipple and the head 50 of the packer. After the shear pins have been severed, the first tubing string is further lowered and simultaneously rotated clockwise slightly after which it is lifted to cause the inward ends of the lugs 70a and 71a to follow the J-slots 130 and 131 effecting disengagement of the lugs from the lower portion of the landing nipple so that the landing nipple may be lifted from the packer head.

With the landing nipple thus disengaged from the packer head the first tubing string and the landing nipple are lifted to the surface where the necessary service on the landing nipple may be carried out. For example, some of the various seals and seats in the landing nipples may require replacement. After completing the service on the landing nipple, the nipple is again secured to the lower end of the first tubing string and lowered by means of the tubing string back to the packer head where it is guided into the bore 52 by the upwardly and outwardly flared upper end of the bore 52. The tubing string is manipulated to cause the J-slots on the lower portion of the landing nipple to become engaged with the inward ends 70a and 71a of the lugs 70 and 71. When the lugs are re-engaged in the J-slot, the landing nipple is again secured to the packer head and the first tubing string may be placed in the degree of tension required.

When the second landing nipple and second tubing string are to be removed from the upper packer, the tubing string is lifted in an upward direction. As the second landing nipple is pulled upwardly by the tubing string, the collet bosses 164 on the collet fingers 163 at the lower end of the landing nipple will be sprung inwardly upon contact with the lower shoulder 82 on the ring 80 allowing the collet to slip through the ring and effectively release or unlock the second landing nipple so that the landing nipple is now free and may be lifted from the packer head by the tubing string. When reinsertion of the second landing nipple into the packer head is desired, it is lowered on the second tubing string until the collet is directed into the bore 53 by the upwardly and outwardly flared portion 53a at the upper end of the bore. The collet moves downwardly through the bore until the bosses on the collet fingers are snapped inwardly by the ring 80 allowing the collet bosses to pass through the ring to again lock the second landing nipple within the packer head. As previously explained, when the collet bosses pass through the ring they will snap outwardly to effectively lock the landing nipple within the packer head.

The third landing nipple may be lifted by the third tubing string from the packer head by pulling the tubing string in an upward direction causing the withdrawal of the landing nipple from the bore 54 in the packer head. The landing nipple is removed from the bore by lifting the third tubing string in an upward direction. As described above and shown in FIGURE 10, there is no locking mechanism retaining the third landing nipple within the bore and thus the landing nipple is simply withdrawn upwardly to remove it from the bore. When reinsertion of the third landing nipple into the bore is desired, it is lowered on the third tubing string into the bore until the lower shoulder 191 rests against the shoulder 90 within the bore.

It has been previously indicated that all three of the landing nipples and their respective tubing strings may be simulatneously removed from the upper packer. It will be evident from FIGURE 3 that when more than one of the landing nipples is removed from the packer head it is necessary in reinserting the landing nipples that the largest of the nipples be first lowered. For example, if the first and second landing nipples are removed, the first landing nipple must be first reinstalled before an attempt is made to install the second landing nipple. If an attempt is made to reinsert the second landing nipple before the first, it will be obvious that the second landing nipple will most probably enter the bore 52 since it is the largest of the bores, and it is most likely in manipulating the tubing string and landing nipple that the landing nipple will more easily find its way into the largest bore which is open at the time. For example, if all three of the landing nipples are withdrawn and an effort is made to reinstall the third or smallest of the three, then the probabilities are that unless they are installed in an order of decreasing size the third landing nipple will readily drop into either of the bores 52 and 53 before it will enter its own bore 54. From the surface there is no way to detect which of the other bores it is in. Where the largest of the landing nipples which has been removed is first reinserted, it obviously can enter only the bore which is the proper size to receive it.

It will now be seen that a new and improved form of well production system has been illustrated and described wherein several formations may be produced using pumps and valves which may be withdrawn and installed without removal of the entire system from the well bore.

It will be further seen that there has been provided a well tool for producing several formations communicating with a well bore through tubing strings which may be removed from and re-engaged with a packer without disturbing the positioning of the packer within the casing of the well bore. It will also be seen that there has been provided a new and improved packer head for use with a multiple string packer where pump and valve assemblies and tubing strings operatively associated with the head may be removed from and introduced into the head without disengaging the head from the packer while the packer is set in the well bore.

It will be further seen that there is provided a system for producing fluids from several zones through a single well bore in which the fluids produced from a first zone along with power oil used in producing that zone are intermixed and returned through a tubing string while fluids produced from a second zone along with power oil used in producing such fluids are intermixed and returned to the surface through an annular space around the tubing strings within the well casing.

It will also be seen that there has been described and illustrated a new and improved multiple string down-hole packer usable with hydraulic down-hole pumps.

It will be further seen that there has been provided a multiple string packer for use with hydraulic down-hole pumps which will permit the pumps to be withdrawn for servicing without disturbing the setting of the packer in the well bore.

It will be seen that the system for producing multiple zones includes a lower permanent type packer along with an upper retrievable multiple-string packer which is set in the well bore by the weight of a tubing string connected to the packer.

It will also be seen that the system for production includes port means through one tubing string for producing one zone into the annular space within the well casing and fluid flow passage means through a packer head on a retrievable multiple string packer for conducting fluids from one of the tubing strings across into another of the tubing strings.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A system for producing fluids from a well bore comprising in combination: lower packer means positioned in said well bore above a lower formation; upper multiple string packer means positioned in said well bore above an upper formation; a first tubing string connected through said lower packer means and said upper packer means to provide fluid communication with the lower formation in said well bore below said lower packer means; a second tubing string secured through said upper packer means in communication with the upper formation in said well bore between said upper and lower packer means; a third tubing string operatively connected with and terminating in said upper packer means; means providing fluid communication through said upper packer means between said first and said third tubing strings; each of said tubing strings being separately removable from operative connection with said upper packer means and removable from said well bore independently of said upper packer means and the other tubing strings; and pump means associated with at least said first and said second tubing strings for pumping fluids to the surface from each of said formations through separate flow paths.

2. A system for producing fluids from a well bore comprising in combination: lower packer means positioned in said well bore above a lower formation; upper multiple string packer means positioned in said well bore above an upper formation; first tubing string means secured through both of said packer means in communication with said well bore below said lower packer means; second tubing string means connected through said upper packer means in communication with said well bore between both of said packer means; third tubing string means connected into and terminating in said upper packer means; means associated with said upper packer means providing a flow passage for fluids to flow from said first tubing string means into said third tubing string means; pump means associated with said first tubing string means for pumping fluids from said well bore below said lower packer means into said third tubing string means; pump means associated with said second tubing string means for pumping fluids from said well bore between both of said packer means into said well bore above said upper packer means; and means providing a separate releasable operative connection between each of said tubing strings above said upper packer means and said upper packer means providing for removal of each of said tubing strings and the pump means associated with said first and second tubing strings from said well bore above said upper packer means independently of each other and without removing said upper packer means.

3. A system for producing fluids from a well bore comprising in combination: lower packer means positioned in said well bore above a lower formation; upper multiple string packer means positioned within said well bore above an upper formation; packer head means secured on said upper packer means; first tubing string means secured from said head means through each of said packer means in communication with said lower formation in said well bore below said lower packer means; second tubing string means secured from said head means through said upper packer means in communication with said upper formation in well bore below said upper packer means; third tubing string means operatively connected with said packer head means and terminating therein; said packer head means being provided with fluid flow passage means interconnecting said first tubing string means and said third tubing string means; pump means associated with said first tubing string means for pumping fluids from said well bore below said lower packer means into said third tubing string means; pump means associated with said second tubing string means for pumping fluids from said upper formation in said well bore below said upper packer means into said well bore above said upper packer means; and means providing a separate releasable operative connection between each of said tubing strings and the upper packer means whereby each of said tubing strings may be disconnected from said upper packer means and removed from said well bore independently of the other tubing strings and without removing said upper packing means, said pump means associated with said first tubing string and said pump means associated with second tubing string being removable with the tubing string with which said pump means is associated.

4. A system for producing fluids from a well bore comprising in combination: a lower single string packer in said well bore above a lower formation; an upper retrievable type multiple string packer set in said well bore above an upper formation, said upper packer having mechanically actuated slips for engaging the wall of said well bore to support said packer in said well bore and expandable seal elements for effecting a sealed relationship with the wall of said well bore; a packer head secured on said upper packer; a first tubing string connected into said packer head; a tubing connection from said head through said upper packer and said lower packer in communication with said well bore below said lower packer to provide a continuous flow passage from said first tubing string to below said lower packer; a second tubing string connected to said packer head and through said upper packer in communication with said well bore below said upper packer; a third tubing string connected into and terminating in said packer head; said packer head being provided with means forming a fluid flow path between said first tubing string and said third tubing string; a hydraulic pump and valve assembly in said first tubing string for pumping fluids from said well bore from below said lower packer through said packer head into said third tubing string; and a pump and valve assembly in said second tubing string for pumping fluids from said well bore from below said upper packer into said well bore above said upper packer.

5. A system for producing fluids from a well bore comprising in combination: a lower packer set in said well bore above a lower formation; an upper multiple string packer set in said well bore above an upper formation; a packer head secured to said upper packer, said packer head being provided with first, second and third longitudinally extending bores, said first and second bores extending through said head, said third bore terminating in said head, said packer head being further provided with a cross-over flow passage between said first and said third bores; tubing structure connected from said upper packer through said lower packer providing fluid communication between said first bore in said packer head through said upper packer with the lower formation below said lower packer within said well bore; a landing nipple operatively releasably associated with each of said bores in said packer head; a hydraulic pump and valve assembly operatively associated with the landing nipple in said first bore for pumping fluids from said lower formation below said lower packers through said first bore into said third bore; a hydraulic pump and valve assembly operatively associated with the landing nipple in said second bore for pumping fluids from said upper formation in said well bore below said upper packer into said well bore above said upper packer; a tubing string extending from the surface operatively connected to the landing nipple in said first bore; a tubing string extending from the surface operatively connected to the landing nipple in said second bore; and a tubing string extending from the surface operatively connected to the landing nipple in said third bore; each of said tubing strings and the landing nipple connected thereto being separately removable from said well bore above said packer head without disturbing said packers.

6. A system for producing fluids from at least two formations through a well bore comprising in combination: a lower permanent type single-string packer positioned in said bore above a lower formation; an upper multiple-string retrievable type packer positioned in said well bore above an upper formation, said upper packer including mechanically actuated slips for securing said packer in said well bore, expandable seal elements for effecting a sealed relationship with said well bore, and hydraulically actuated hold-down buttons to restrain said packer from upward movement within said well bore, said buttons being activated in response to a pressure across said packer in excess of a predetermined value; a packer head secured on said upper packer, said packer head being provided with first, second, and third longitudinal bores, said first and second bores extending through said head into communication with first and second bores extending through said upper packer, said third bore terminating in said head, a flow passage connecting the lower end of said third bore into said first bore through said head; a tubing connection extending from the first bore in said upper packer through said lower packer to provide fluid communication through said packers below said lower packer; a first landing nipple engaged in said first bore in said head; a hydraulic pump and valve assembly positioned within said first landing nipple for pumping fluids from below said lower packer through said packer head into said third tubing string; a second landing nipple engaged in said second bore in said packer head to provide fluid communication through said upper packer into the space within the said well bore between said upper and lower packers; a hydraulic pump and valve assembly positioned within said second landing nipple for pumping fluids from below said upper packer into the annular space within said well bore above said upper packer; a third landing nipple positioned in said third bore in said packer head; a first tubing string engaged with said first landing nipple and extending to the surface; a second tubing string engaged with said second landing nipple and extending to the surface; and a third tubing string engaged with said landing nipple and extending to the surface.

7. A system for producing fluids in a well bore from an upper and a lower formation through separate conduits to the surface comprising in combination: a lower single string type packer positioned in said well bore above said lower formation; an upper multiple-string type retrievable packer positioned in said well bore above said upper formation, said upper packer having first and second bores extending therethrough; a tubing section connected into said first bore in said upper packer and extending downwardly therefrom through said lower packer; a packer head engaged with said upper packer, said packer head being provided with first, second, and third longitudinally extending bores, said first bore connecting with said first bore in said packer, said second bore connecting with said second bore in said packer, said third bore terminating within said packer head, and said packer head being further provided with a cross-over flow passage interconnecting said first bore and said third bore for flowing fluids from said first bore into said third bore; a first landing nipple engaged in said first bore in said packer head; a hydraulic pump and valve assembly positioned within said first landing nipple to pump fluids from below said lower packer through said upper packer and packer head into said third bore; a tubing string connected into said first landing nipple and extending to the surface; a second landing nipple engaged in said second bore in said packer head; a hydraulic pump and valve assembly positioned in said second landing nipple for pumping fluids from the space within said well bore between said packers into the annular space within said well bore above said upper packer; a tubing string connected to said second landing nipple and extending to the surface; and a third tubing string connected to said third landing nipple and extending to the surface.

8. A system for producing fluids from at least two formations through a well bore comprising in combination: a lower single string type packer positioned in said well bore above a lower formation; an upper multiple-string-type packer positioned within said well bore above an upper formation, said upper packer having first and sceond bores extending therethrough, said second bore terminating in communication with said well bore between said packers; a tubing assembly connected into said first bore in said packer extending downwardly from said packer through said lower packer to effect communication between said well bore below said lower packer and said first bore of said upper packer; a packer head secured to said upper packer for connecting tubing strings into said packer, said packer head being provided with first, second and third longitudinally extending bores, said first and second bores extending through said packer head interconnecting with said first and second bores in said upper packer, said third bore terminating in said packer head, said packer head being further provided with a cross-over fluid flow passage extending between said first bore and said third bore, said packer head being provided with a contoured upper end to facilitate insertion of tools into each of said bores; a first landing nipple secured in said first bore of said packer head, said first landing nipple having means for releasably engaging said first bore and port means adapted to communicate with said cross-over flow passage in said packer head; a first tubing string connected to said first landing nipple and extending to the surface; a second landing nipple engaged in said second bore of said packer head, said second landing nipple having means for locking said nipple within said bore and side port means to provide fluid communication through said landing nipple above said packer head into said well bore above said packer; a second tubing string connected to said second landing nipple and extending to the surface; a third landing nipple engaged in said third bore in said packer head; a third tubing string connected to said third landing nipple and extending to the surface; a hydraulic pump and valve assembly positioned within said first landing nipple for pumping fluids from said well bore below said lower formation through said cross-over flow passage into said third tubing string; and a hydraulic pump and valve assembly positioned in said second landing nipple for pumping fluids from said well bore between said packers through said ports in said second landing nipple into said well bore above said upper packer.

9. A production assembly for use in producing fluids from at least two zones in a well bore comprising in combination: a lower packer engaged in said well bore above a lower formation; an upper multiple-string packer engaged in said well bore above an upper formation, said upper packer having at least a first bore and a second bore extending longitudinally therethrough; a tubing assembly connected with said first bore in said upper packer and extending through said lower packer to effect communication with said well bore below said lower packer into said first bore in said upper packer; a packer head engaged on said upper packer, said packer head being provided with first, second and third bores extending longitudinally thereof, said first and second bores extending through said packer head in communication, respectively, with the first and second bores in said upper packer, and said third bore terminating in said packer head, said packer head being further provided with a cross-over fluid passage interconnecting the lower portion of said third bore and said second bore; a first landing nipple operatively engageable with said first bore in said packer head, said first landing nipple having ports for cooperating with said cross-over fluid flow passage in said packer head to provide fluid communication between the interior of said first landing nipple and said third bore in said packer head, said first landing nipple being adapted to receive a hydraulic pump and valve assembly for pumping fluids from within said well bore below said lower packer through said tubing assembly and said first bores in said upper packer and said packer head into said third bore through said cross-over fluid flow passage; a second landing nipple operatively engageable with said second bore in said packer head, said second landing nipple having port means through the side thereof for fluid communication above the upper packer into said well bore, said second landing nipple being adapted to receive a hydraulic pump and valve assembly for pumping well fluids from said well bore below said upper packer into said well bore above said upper packer; and a third landing nipple operatively engageable with said third bore in said packer head.

10. A system for producing fluids from two zones within a well bore comprising in combination: a lower permanent type single string packer positioned in said well bore above a lower formation; an upper multiple-string retrievable type packer positioned in said well bore above an upper formation, said upper packer including mechanical slips for supporting said packer within said well bore, hydraulically actuable hold-down buttons for restraining said packer from upward movement in response to a pressure within said well bore below said upper packer above a predetermined value, and expandable seal elements for effecting a sealed relationship around said packer with the wall of said well bore, said upper packer being provided with first and second longitudinally extending bores providing fluid flow passages therethrough, said second bore terminating below said upper packer between said packers to provide fluid communication through said packer from said upper formation; a tubing assembly engaged through said lower packer and connected into said first bore of said upper packer to provide fluid communication with said well bore below said lower packer; a packer head engaged on said upper packer, said packer head being provided with first, second and third longitudinally extending bores forming flow passages, said first bore in said head being in communication with said first bore through said upper packer, said second bore through said head being in communication with said second bore through said packer, said head being further provided with a cross-over bore forming a fluid flow passage through said head between said first bore and said third bore, said third bore terminating within said packer head, the upper end of said packer head being contoured around the upper ends of said bores to facilitate insertion of tools into said bores from above said head, said packer head being also provided with bores extending into said first bore for engaging locking means through said head into said first bore; a first landing nipple positioned in said first bore in said head in engagement with locking means extending through said packer head into said first bore, said first landing nipple having side ports extending therethrough at a location along the length of said nipple to cooperate with said cross-over fluid flow passage through said head to provide communication from within said first landing nipple through said packer head into said third bore, said first landing nipple having an internal annular shoulder for supporting a standing valve and hydraulic pump assembly within said nipple; a second landing nipple positioned within said second bore in said packer head, said second landing nipple and said bore being provided with shoulder means for removably engaging said landing nipple within said bore, said landing nipple being provided with port means providing fluid communication through said nipple into said well bore above said upper packer and with internal annular shoulder means for supporting a standing valve and hydraulic pump assembly within said nipple; and a third landing nipple positioned within said third bore in said packer head.

11. A system for producing fluids from two zones in a well bore comprising in combination: a lower permanent type single-string packer engaged within said well bore above a lower formation; an upper multiple-string packer engaged within said well bore above an upper formation, said upper packer including mechanically actuatable slips for engaging the wall of said well bore for supporting said packer within said well bore, hydraulically actuatable holddown buttons for restraining said packer from upward movement in response to pressure in excess of a predetermined value below said upper packer, expandable seal elements for effecting a sealed relationship with the wall of said well bore, said upper packer being further provided with first and second carrier mandrels forming first and second bores extending therethrough; a tubing assembly engaged with said first carrier mandrel on the lower end of said packer and extending through said lower packer to provide fluid communication from said well bore below said lower packer into said first bore through said packer; a packer head engaged with said carrier mandrels on the upper end of said upper packer, said packer head being provided with first, second and third bores extending longitudinally thereof, said first and second bores extending through said packer head in communication respectively with said first and second bores through said upper packer, and said third bore terminating in said packer head, said packer head having formed therein a cross-over flow passage interconnecting the lower portion of said third bore with said first bore; said packer head being contoured at the upper end thereof around the upper ends of said bores to facilitate insertion of tools into said bores from above said packer head; a first landing nipple engaged in said first bore of said packer head, said first landing nipple having formed in the lower portion thereof J-slots extending along the outer surface of said lower portion; lugs engaged through said packer head into said J-slots on said first landing nipple to provide releasable locking means between said first landing nipple and said packer head; shear screws engaged between the lower portion of said first landing nipple and said packer head, said first landing nipple being also provided with side ports positioned to cooperate with said cross-over fluid flow passage extending through said packer head from said first bore to permit fluid communication through said first landing nipple into said first bore and from said first bore into said third bore; packing means around said first landing nipple above and below said ports in said landing nipple to cooperate with the inside wall of said first bore to effect sealing relationship between said landing nipple and said first bore; an internal annular shoulder within said first landing nipple for supporting a standing valve and hydraulic pump assembly within said nipple; a first tubing string extending from the surface and engaged with the upper end of said first landing nipple; said packer head being provided within said second bore with an annular ring forming an upper and lower shoulder within said bore; a second landing nipple engaged within said second bore in said packer head; said second landing nipple including a collet on the lower end thereof for cooperating with said ring within said second bore of said packer head to removably engage said second landing nipple within said bore, said second landing nipple being further provided with side ports at a location above said second bore of said packer head to provide fluid communication into said well bore above said packer head from within said second landing nipple, said second landing nipple being also provided with an internal annular shoulder for supporting a standing valve and hydraulic pump assembly within said nipple; a second tubing string extending from the surface connected into said second landing nipple; a third landing nipple positioned within said third bore of said packer head, the lower end of said third landing nipple resting on an internal annular shoulder within said third bore above said crossover fluid flow passage extending from said third bore into said first bore, said third landing nipple having a seal assembly around the outer surface thereof to effect sealing relationship with the wall of said third bore; a tubing string extending from the surface and connected into said third landing nipple; a hydraulic pump and valve assembly positioned within said first landing nipple, said valve being a check valve to prevent back flow of fluids into said well bore below said lower packer from above said side ports in said first landing nipple and said hydraulic pump having ports for discharging fluids into said side ports through said first landing nipple whereby fluids pumped by said hydraulic pump will flow through said side ports into said crossover fluid flow passage through said packer head into the lower end of said third bore through said packer head; and a hydraulic pump and valve assembly positioned within said second landing nipple, said valve being a check valve to prevent back flow of fluids from said landing nipple above said valve into said upper formation between said upper and lower packers and said hydraulic pump having ports for discharging pumped fluids into said landing nipple above said valve whereby said fluids flow through said side ports in said landing nipple into the annular space within said well bore above said upper packer.

12. A packer head for use with a multiple-string packer having at least a first and a second bore extending therethrough comprising: body structure having means on the lower end thereof for engagement with said packer, said packer head being provided with first, second, and third longitudinally extending bores, said first and second bores extending through said head and located to communicate with the first and second bores in said packer when said head is engaged on said packer, said third bore terminating in said head, said head being also provided with a cross-over fluid flow passage extending between said first bore and said third bore to permit fluid flow from said first bore into said third bore, each of said bores in said head having internal annular shoulders and sealing surfaces for cooperating with landing nipples releasably positionable therein to interconnect said head with tubing strings extending between the surface and said head through a well bore, whereby said tubing strings may be disposed in fluid communication with said bores of said packer head by connection of tubing strings in said bores, and said tubing may be removed from fluid communication with said bores in said packer head by disengagement of said tubing strings from said bores without disturbing the packer.

13. A head for a multiple string packer having first and second bores extending therethrough comprising: a body engageable on its lower end to the upper end of said packer, said body being provided with at least three bores extending longitudinally thereof, the first and second of said bores extending through said body into communication with the first and second bores through said packer when said body is engaged on said packer, the third of said bores through said body terminating in said body, said body being also provided with a cross-over fluid flow passage interconnecting said first bore and said third bore, said first bore in said body having an annular recess formed in the wall thereof in communication with said cross-over fluid passage, means engaged with said body for removably securing a landing nipple within said first bore, and said second and third bores being provided with shoulders for supporting a landing nipple engageable therein.

14. A packer head in accordance with claim 13, wherein said body is contoured at the upper end thereof to provide substantially frusto-conical entries for the first and second bores in said body.

15. A packer head for use with a multiple string packer having first and second bores to permit pumping of fluids from at least two zones within a well bore comprising: a substantially cylindrical body having first, second, and third longitudinally extending bores and engageable at its lower end with the upper end of said packer so that said first and second bores will be in communication with the first and second bores, respectively, in said packer, said third bore terminating in said body, said body being further provided with a cross-over fluid flow passage extending between said first bore and said third bore, said body having formed within said first bore an annular recess around the inner wall of said bore in communication with said cross-over fluid flow passage, means associated with said body for detachably securing a landing nipple in said first bore, means secured within said body in said second bore forming shoulders therein for supporting and detachably locking a landing nipple within said bore, and said body being contoured at the upper end thereof to form frusto-conical surfaces leading into the first and second bores.

16. A packer head in accordance with claim 15 including in addition thereto, a plurality of hydraulically actuatable hold-down buttons movably connected to said body for engaging a wall of a well bore to restrain said packer from upward movement in response to a pressure level below said packer above a predetermined value.

17. A packer head for use with a multiple string packer having first and second bores extending therethrough comprising in combination: a body substantially cylindrical in shape and provided with first and second longitudinally extending bores opening through the upper and lower ends of said body and a third bore terminating within said body, said body having a substantially horizontal bore forming fluid flow passage between said first bore and said third bore near the lower end of said third bore, said body having formed within said first bore an annular recess extending around the inner wall thereof at the location of the connection of said cross-over flow passage into said bore; lugs engaged through said body into said first bore to cooperate with locking means on a landing nipple detachably engageable within said bore; shear screws engageable through said body extending into said first bore to secure a landing nipple within said first bore; an annular ring member secured within said second bore forming upper and lower internal annular shoulders within said bore to cooperate with seat and locking means on a landing nipple engageable within said second bore; said body being provided with an internal annular shoulder within said third bore above said cross-over fluid passage for supporting a landing nipple within said third bore; said body being contoured on its upper end to provide surfaces sloping into the upper ends of said bores to facilitate insertion of landing nipples into said bores; said body being also provided with a plurality of recesses formed along the outer surface thereof, and with transverse flow passages extending between opposites of said recesses and intersecting said second bore to impose fluid pressure within said recesses from said bore; hold-down buttons having serrated outer surfaces slidably positioned within said recesses; and spring assemblies secured to said body along the outer surface thereof and extending over and in contact with said hold-down buttons to restrain said hold-down buttons within said recesses in a retracted position until the pressure within said recesses behind said hold-down buttons exceeds a predetermined value.

18. Apparatus for connecting a multiple string packer having at least two bores extending therethrough with a plurality of tubing strings for pumping well fluids from at least two zones in said bore hole comprising in combination: a packer head provided with first and second bores extending longitudinally therethrough to interconnect with said bores in said packer when said head is assembled on said packer and a third longitudinally extending bore terminating within said head, said packer head being further provided with a cross-over fluid flow passage interconnecting said first bore and said third bore, said head being also provided within said first bore with an annular recess around the inner wall in communication with said cross-over passage; means secured within said second bore providing a shoulder for supporting and locking a landing nipple therein; said packer head being additionally provided with a shoulder within said third bore to support a landing nipple therein; a landing nipple engageable within said first bore for connecting a first tubing string into said head and supporting a free standing hydraulic pump and valve assembly; said first landing nipple being provided with radially positioned ports to cooperate with said cross-over flow passage to permit fluid flow from within said first landing nipple into said third bore through said cross-over passage; means secured within said first landing nipple providing an annular shoulder therein for supporting a hydraulic pump and standing valve assembly within said nipple, said means being positioned below said radial ports in said nipple; a second landing nipple engageable within said second bore of said packer head, said landing nipple being provided on the lower end thereof with a collet adapted to cooperate with the shoulder means within said second bore for releasably securing said second landing nipple within said bore; packing means around said second landing nipple for effecting sealing engagement with the wall of said second bore in said packer head above said collet; an internal annular ring within said second landing nipple forming an annular shoulder therein for supporting a standing valve and hydraulic pump assembly; and said second landing nipple being provided with port means above said internal annular ring to provide fluid communication from within said landing nipple above the upper end of said packer head.

19. Apparatus for use with a multiple string type packer, said packer having at least first and second longitudinal bores extending therethrough, said apparatus comprising in combination: a packer head adapted to be secured to the upper end of said packer, said packer head having first and second longitudinal bores extending therethrough, said bores communicating respectively with said first and second bores in said packer when said head is engaged on said packer, said head being further provided with a third bore terminating in said head; said head being also provided with a cross-over fluid flow passage extending from said first bore into said third bore and an annular recess within said first bore communicating with said cross-over flow passage; an internal ring engaged within said second bore forming upper and lower annular shoulders therein; said head being provided with an internal annular shoulder within said third bore above the connection of said cross-over flow passage into said bore; the upper end of said head having contoured surfaces for guiding tools into said bores in said head; lugs engaged through said packer body projecting into said first bore; a first landing nipple engageable with said packer head in said first bore for connecting a first tubing string to said head and supporting a hydraulic pump and valve assembly therein; said first landing nipple having a plurality of ports located to cooperate with said annular recess within said first bore and having J-slots formed in the outer surface of the lower portion thereof to cooperate with said lugs through said packer head for releasably engaging said landing nipple within said first bore; a packing assembly around said first landing nipple above and below said radial ports for effecting sealing relationship with the wall of said first bore; a ring member secured within said first landing nipple forming an annular shoulder therein for supporting a standing valve and hydraulic pump assembly within said nipple, said shoulder being below said radial ports in said nipple; a second landing nipple engageable within said second bore of said packer head, said second nipple having a collet formed on the lower portion thereof, said collet being engageable with the upper and lower shoulders within said second bore for releasably securing said second landing nipple within said second bore; packing assemblies around said second landing nipple above said collet to effect a sealing relationship with the wall of said second bore; said second landing nipple being provided with at least one port through the wall thereof in the portion of said nipple above said packer head to permit fluids to flow from within said nipple; means within said second landing nipple forming an annular shoulder therein below said port through the wall thereof for supporting a standing valve and hydraulic pump assembly within said landing nipple; and a third landing nipple engageable with said third bore on a shoulder formed within said bore above the connection of said cross-over fluid flow passage into said bore, said third landing nipple having a packing assembly for effecting sealing engagement with the wall of said third bore.

20. An apparatus for producing fluids from at least two zones in a well bore comprising in combination: a multiple string packer having slips for engaging the wall of the well bore to support said packer within said well bore and expandable seal elements for effecting a sealed relationship with the wall of the well bore around the packer; said packer being provided with first and second bores extending therethrough; a packer head secured at its lower end to the upper end of said packer, said packer head being provided with a longitudinally extending first bore in communication with said first bore in said packer, a longitudinally extending second bore in communication with said second bore in said packer, and a third longitudinally extending bore terminating within said packer head; and said packer head being further provided with a cross-over fluid flow passage extending between said first bore and the lower portion of said second bore.

21. A well apparatus for use in producing fluids from two zones in a well bore comprising in combination: a multiple-string retrievable type well packer provided with a first bore and a second bore and including mechanically actuatable slips for engaging said well bore for supporting said packer within said well bore and expandable seal elements for effecting a sealed relationship between said packer and said well bore; a packer head engaged on the upper end of said packer, said packer head being provided with longitudinally extending first and second bores communicating respectively with said first and second bores in said packer and with a third bore terminating within said packer head; said packer head being further provided with a cross-over fluid flow passage interconnecting said first bore and said third bore; a first landing nipple releasably engaged within said first bore of said packer, said landing nipple being provided with radial ports located to cooperate with said cross-over fluid flow passage in said packer head; packer assemblies around said first landing nipple above and below said ports through said nipple for effecting a sealing engagement with the wall of said first bore; releasable locking means associated with said packer head and said first landing nipple; means within said first landing nipple below said ports through said nipple forming an annular shoulder therein for supporting a standing valve and hydraulic pump assembly within said nipple; a second landing nipple detachably engaged within said second bore of said packer head; means within said second landing nipple forming an annular shoulder therein for supporting a standing valve and hydraulic pump assembly within said nipple; said second landing nipple being provided with at least one port above said internal shoulder for allowing fluid flow through the wall of said nipple above the upper end of said packer head; and a third landing nipple engaged within said third bore of said packer head.

22. A system for producing fluids from a multiple zone well bore comprising: lower packer means set in a well above a lower formation; upper multiple string packer means set in said well above an upper formation; tubing strings positioned in said well and releasably operatively connected with said upper packer means, one of said tubing strings having an extension through said upper packer means and said lower packer means in communication with the lower well formation below said lower packer means, and another of said tubing strings having an extension through said upper packer means in communication with said upper formation below said upper packer means; and separate pump means associated with each of said one and another of said tubing strings for pumping fluid from said well formations to the surface, said releasable operative connection of said tubing strings with said upper packer means permitting each of said tubing strings above said upper packer means and the pump means associated therewith to be removed from the well.

References Cited
UNITED STATES PATENTS

| | | | |
|---|---|---|---|
| 2,242,166 | 5/1941 | Bennett | 103—46 X |
| 2,605,712 | 8/1952 | Davis et al. | 103—46 |
| 2,850,099 | 9/1958 | Brown. | |
| 2,951,445 | 9/1960 | Calvert et al. | 103—4 |
| 3,064,580 | 11/1962 | Calvert et al. | 103—4 |
| 3,084,630 | 4/1963 | Massey | 103—4 |
| 3,166,126 | 1/1965 | Wents et al. | 166—120 |

CHARLES E. O'CONNELL, *Primary Examiner.*

D. H. BROWN, *Assistant Examiner.*